US009923933B2

(12) United States Patent
Das et al.

(10) Patent No.: US 9,923,933 B2
(45) Date of Patent: *Mar. 20, 2018

(54) ENHANCING USER EXPERIENCE FOR INTERNET PROTOCOL MULTIMEDIA CORE NETWORK SUBSYSTEM BASED COMMUNICATION SERVICES

(71) Applicant: AT&T Intellectual Property I, L.P., Atlanta, GA (US)

(72) Inventors: Jayanta Das, Morganville, NJ (US); Rupam Choudhury, Manalapan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,598

(22) Filed: Mar. 16, 2017

(65) Prior Publication Data

US 2017/0187757 A1    Jun. 29, 2017

Related U.S. Application Data

(63) Continuation of application No. 14/964,857, filed on Dec. 10, 2015, now Pat. No. 9,621,598, which is a continuation of application No. 14/064,420, filed on Oct. 28, 2013, now Pat. No. 9,241,233.

(51) Int. Cl.
| | |
|---|---|
| *H04L 29/06* | (2006.01) |
| *H04M 1/57* | (2006.01) |
| *H04M 1/2745* | (2006.01) |

(52) U.S. Cl.
CPC ...... *H04L 65/1016* (2013.01); *H04L 65/1006* (2013.01); *H04M 1/274508* (2013.01); *H04M 1/576* (2013.01)

(58) Field of Classification Search
CPC .............. H04L 65/106; H04L 65/1006; H04M 1/274508; H04M 1/576
See application file for complete search history.

(56) References Cited

U.S. PATENT DOCUMENTS

| | | | |
|---|---|---|---|
| 7,920,523 | B2 | 4/2011 | Grinshpun et al. |
| 8,144,644 | B1 * | 3/2012 | Mohan .................... H04W 4/16 370/321 |
| 8,335,192 | B2 | 12/2012 | Mahajan |
| 8,433,303 | B2 | 4/2013 | Naqvi et al. |

(Continued)

OTHER PUBLICATIONS

Fraz Tajammul. "LTE Call Flows" ATT Best Practices: LTE Performance & Optimization. Jul. 12, 2011. 15 pages.

(Continued)

*Primary Examiner* — Duc C Ho
(74) *Attorney, Agent, or Firm* — Amin, Turocy & Watson, LLP

(57) ABSTRACT

User experience is enhanced for Internet Protocol Multimedia Core Network Subsystem (IMS) based rich communication services in telecommunication environments. A system receives, from a user equipment, a session initiation protocol invitation packet to commence a communication session, and as a function of the session initiation protocol invitation packet, displays an access network technology type used by the user equipment to access a network device associated with a multiple access communication network.

20 Claims, 11 Drawing Sheets

(56) References Cited

U.S. PATENT DOCUMENTS

| | | | |
|---|---|---|---|
| 8,868,072 | B2 | 10/2014 | Martinez et al. |
| 2002/0181462 | A1 | 12/2002 | Surdila et al. |
| 2006/0209775 | A1 | 9/2006 | Lim et al. |
| 2006/0218291 | A1 | 9/2006 | Zhu et al. |
| 2007/0050083 | A1 | 3/2007 | Signorelli et al. |
| 2008/0049725 | A1 | 2/2008 | Rasanen |
| 2008/0192728 | A1* | 8/2008 | Levesque ............ H04L 12/2898 370/352 |
| 2008/0304471 | A1 | 12/2008 | Jackson et al. |
| 2009/0164293 | A1 | 6/2009 | Coley |
| 2009/0190533 | A1 | 7/2009 | Zhu et al. |
| 2011/0003590 | A1* | 1/2011 | Yoon .................. H04W 36/385 455/432.1 |
| 2011/0249650 | A1 | 10/2011 | Seppanen et al. |
| 2012/0026865 | A1 | 2/2012 | Fan et al. |
| 2012/0069776 | A1 | 3/2012 | Caldwell et al. |
| 2013/0035138 | A1 | 2/2013 | Abbott |
| 2013/0044603 | A1 | 2/2013 | Macias et al. |
| 2013/0196663 | A1* | 8/2013 | Yurkevich ............ H04W 8/183 455/435.3 |
| 2014/0064123 | A1 | 3/2014 | Kim et al. |
| 2014/0087748 | A1* | 3/2014 | Hong ................ H04W 72/1215 455/452.1 |
| 2015/0237560 | A1* | 8/2015 | Saida ................. H04W 36/365 370/331 |

OTHER PUBLICATIONS

Non-Final Office Action dated May 19, 2015 for U.S. Appl. No. 14/064,420, 17 pages.

Office Action dated Jul. 14, 2016 for U.S. Appl. No. 14/964,857, 25 pages.

\* cited by examiner

ENHANCING USER EXPERIENCE FOR INTERNET PROTOCOL MULTIMEDIA CORE NETWORK SUBSYSTEM BASED COMMUNICATION SERVICES

RELATED APPLICATION

The present application is a continuation of U.S. patent application Ser. No. 14/964,857, filed Dec. 10, 2015, and entitled "ENHANCING USER EXPERIENCE FOR INTERNET PROTOCOL MULTIMEDIA CORE NETWORK SUBSYSTEM BASED COMMUNICATION SERVICES," which is a continuation of U.S. patent application Ser. No. 14/064,420 (now U.S. Pat. No. 9,241,233), filed Oct. 28, 2013, and entitled "ENHANCING USER EXPERIENCE FOR INTERNET PROTOCOL MULTIMEDIA CORE NETWORK SUBSYSTEM BASED COMMUNICATION SERVICES," the entire contents of which applications are hereby incorporated by reference herein.

TECHNICAL FIELD

The disclosed subject matter relates to enhancing user experience for Internet Protocol Multimedia Core Network Subsystem (IMS) based communication services in multiple access wireless communication networks/infrastructures.

BACKGROUND

The impending technology transformations in next generation diverse access networks and feature rich application/service layer advances can adversely impact perceived user experience when end-points (e.g., handheld devices, subscriber units, user equipment units, and the like) and their associated access technology functionalities are diverse in capabilities.

DETAILED DESCRIPTION

Figure 1:
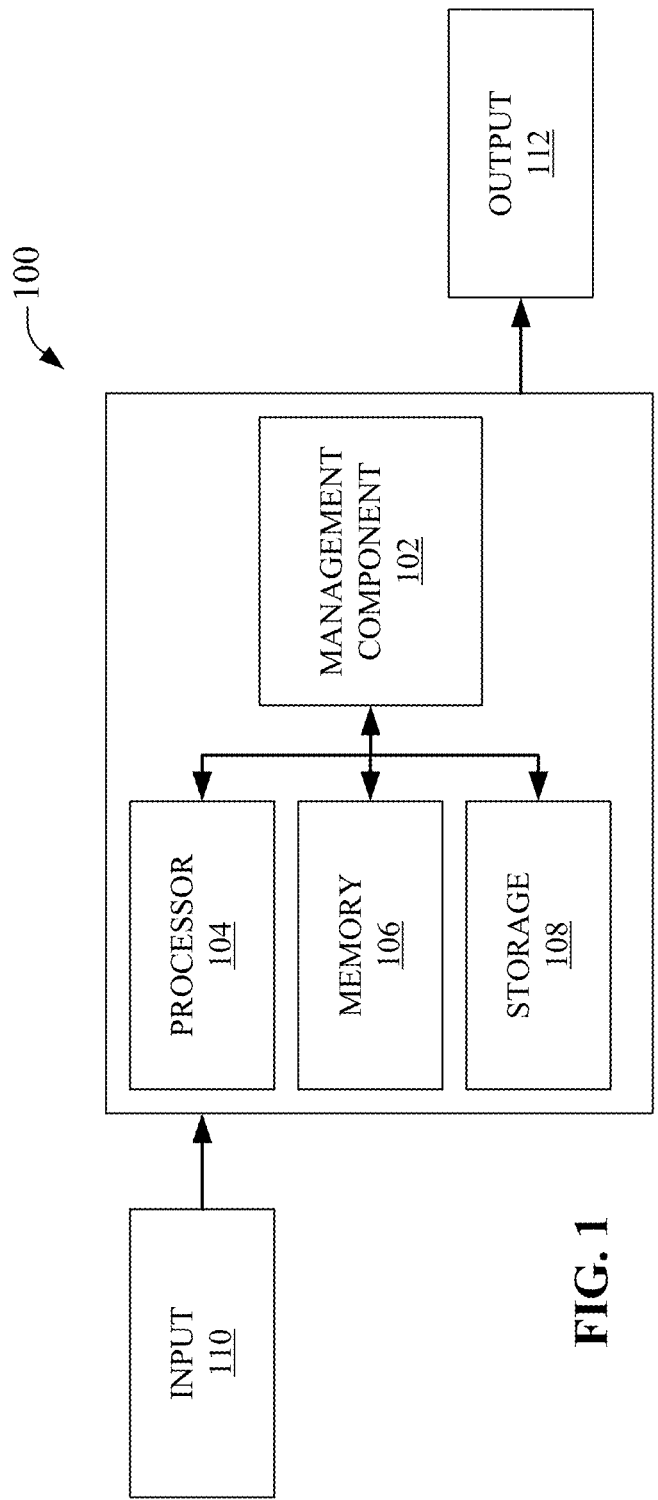
FIG. 1 is an illustration of a system for enhancing user experience for Internet Protocol Multimedia Core Network Subsystem (IMS) based rich communication services in multiple access wireless communication networks/infrastructures in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Broad band access infrastructure—both in mobility and wire-line—has been evolving and is now transitioning to next generation technologies such as, in mobility long term evolution (LTE), the adoption and implementation of LTE-Advanced technical standards, in wire-line the implementation of IEEE 802.11ac standards and utilization of gigabit passive optical networks (G-PON). Implementation of such next generation technologies has led to the implementation and the desire to utilize applications that are intensely feature rich that, until recently, have been unavailable, unknown, and/or untenable using existing circuit switched telecommunication infrastructures.

Various industry alliances and standards organizations such as Open Mobile Alliance (OMA), Global System for Mobile Communications Association—originally Groupe Special Mobile (GSM), the $3^{rd}$ Generation Partnership Project (3GPP), and others have been standardizing application and service layer features for internet protocol (IP) based voice, video, and messaging at an accelerated pace. The rich communication suite (RCS) framework specifications from the Open Mobile Alliance and the Global System Mobile Communications Association are examples the provide possibilities to offer feature rich multimedia services to consumers.

The practical concern for telecommunication carriers and/or service providers in regard to the foregoing can be the deterioration in perceived user experience (e.g., a user's perceived experience) in situations where, for instance, end-points (e.g., mobile terminals, handheld devices, user equipment units, smart phones, cell phones, access terminals, laptop computers, tablet computers, notebook computers, devices (e.g., portable or non-portable) with one or more processors, storage aspects, and/or memories, desktop computers, and the like) and/or their respective access networks are diverse in terms of their capabilities. For instance, when an interactive video call is initiated between two end-points—one connected to the internet and/or the multiple access network (e.g., radio access network (RAN) using technologies that allow electronic devices to exchange data or connect to the internet wirelessly using radio waves, such as a Wi-Fi access technology, that are typical where Home eNodeB stations and/or wireless access points are in common use (e.g., coffee shops, airport transit areas, . . . ), while the other end-point is connected to the multiple access network via/through functionalities provided by a long term evolution technology as implemented by a wireless telecommunication provider/carrier—the quality of experience (QoE) from the perspective of the end-point connected to the multiple access network via facilities provided by the long term evolution implementation may not be as robust as compared to the situation where both end-points are directly communicating using the functionalities provided by the same long term evolution implementation (e.g., both end-points are each using a long term evolution implementation provided by the same wireless telecommunication provider/carrier). Thus, if not managed properly and proactively, carriers and service providers can find that this situation can impact on their Promoter Score (NPS).

In accordance with an embodiment, the subject disclosure describes a system that can comprise a memory to store executable instructions, and a processor, coupled to the memory, that facilitates execution of the executable instructions to perform operations. The operations can include receiving, from a user equipment device, a session initiation protocol invitation packet to commence a communication session, and as a function of the session initiation protocol invitation packet, decoding, interpreting, and displaying an access network technology type used by the user equipment device to access a network device associated with a multiple access communication network, wherein the session initiation protocol invitation packet comprises a field that denotes the access network technology type used by the user equipment to initiate sending of the session initiation protocol invitation packet, and wherein the network device accesses the multiple access communication network via a next generation implementation of a long term evolution access technology as well as WiFi access to the Internet via any Internet Service Provider.

The access network technology type used by the user equipment to access the network device can be determined as a function of an access point device coupled to the multiple access communication network, wherein the access point device communicates with the user equipment device via a wireless exchange of data using a radio wave, and/or the access point device is coupled to the multiple access communication network via a transmission technology that transmits digital data over a wire to the multiple access communication network.

Additionally, the system can also comprise operations to associate data representing a pictogram that denotes the access network technology type that is currently being used by the user equipment to access the multiple access communication network with a contact name stored in the memory.

In accordance with a further embodiment, the subject disclosure describes a method, comprising a series of acts that include obtaining a session initiation protocol invitation packet from a device, and initiating display of a message that includes an access technology type employed by the device to transmit the session initiation protocol invitation packet, wherein the session initiation protocol invitation packet comprises a bit field that indicates the access technology type employed by the device to initiate transmission of the session initiation protocol invitation packet.

The access technology type used by the device to wirelessly communicate with a device coupled to a multiple access communication network is determined as a function of the device through which the device is coupled to the multiple access communication network, wherein the device through which the device is coupled to the multiple access communication network employs a radio wave to exchange of packets between the device and the device. Further, the device through which the device is coupled to the multiple access communication network can also transmit a packet over a wire to the multiple access communication network Additional acts that can be performed by the method can include, as a function of the session initiation protocol invitation packet, associating data representing an icon that indicates the access technology type used by the device to wirelessly communicate with a device coupled to a multiple access communication network.

In accordance with a still further embodiment, the subject disclosure describes a computer readable storage device comprising instructions that, in response to execution, cause a computing system comprising a processor to perform operations. The operation can include receiving a session initiation protocol invitation packet from a mobile device, and initiating a display of a message that includes an access network technology type used by the mobile device to transmit the session initiation protocol invitation packet. The session initiation protocol invitation packet can comprise a field that denotes the access network technology type used by the mobile device to initiate sending of the session initiation protocol invitation packet.

Additional operations can also include associating data that represents an icon that denotes the access network technology type used by the mobile device to transmit the session initiation protocol invitation packet with a contact name included in a contacts list file stored to a memory.

The access network technology type used by the mobile device to transmit the session initiation protocol invitation packet can be determined as a function of an access point device coupled to the mobile device and a multiple access communication network, wherein the access point device communicates with the mobile device via a wireless interchange of data using a radio wave, and wherein the access point device communicates with the multiple access communication network via a transmission technology that transmits digital data over a wire to the multiple access communication network. Further, the mobile device can transmit the session initiation protocol invitation packet over an evolved packet core portion of the multiple access communication network and/or via an implementation of a long term evolution aspect of the multiple access communication network.

Turning now to the figures, wherein FIG. 1 illustrates a system 100 for managing user expectation, where user equipment devices access, communicate, and/or conduct data interchange using disparate access network technology types, such as where a first user equipment unit accesses the multiple access communication network using a wireless access point that is connected to a carrier network (or multiple access communication network) via the Internet and an internet facing session border controller, and a second user equipment unit wirelessly accesses the multiple access communication network via a base station connected to the evolved packet core (EPC) and an evolved packet core session border controller, for example. In the foregoing example, the first user equipment unit device can, for instance, be connected to the multiple access communication network using an access point that has implemented a Wi-Fi access technology, whereas the second user equipment unit device can be connected to the multiple access communication network using an implementation of the evolved packet core of a long term evolution access technology.

System 100 can be included in a user equipment unit, such as a subscriber station, mobile device, access terminal, laptop computer, desktop computer, smart phone, cellular phone, notebook computer, tablet computer, personal digital assistant (PDA), and the like. System 100 can include management component 102 that can be coupled to processor 104, memory 106, and storage 108. As illustrated, management component 102 can be in communication with processor 104 for facilitating operation of computer executable instructions and components by management component 102, memory 106 for storing data and the computer executable instructions and components, and storage 108 for providing longer-term storage of data and/or computer executable components and instructions. Additionally, system 100 can also receive input 110 for use, manipulation, and/or transformation by management component 102 to produce one or more useful, concrete, and tangible result. Further, system 100 can also generate and output the useful, concrete, and tangible result produced by management component 102 as output 112.

Management component 102 can receive, as input 110, a session initiation protocol (SIP) invitation packet from a user equipment device that, for example, is coupled to the multiple access communication network via a Wi-Fi access point. The session invitation protocol invitation packet from the user equipment device can be used to initiate or establish a communication session between the calling user equipment device and system 100. Management component 102, having received the session initiation protocol invitation packet, can examine or investigate the session initiation protocol invitation packet to determine whether the session initiation protocol initiation packet contains a field that indicates the access network technology type that was utilized by the user equipment unit to access the multiple access communication network. In this instance, since the initiating user equipment device is connected to the multiple access communication network via a Wi-Fi access point, the session initiation protocol invitation packet will typically contain a field (e.g., a flag or a bit) that denotes that the access network technology type that is being utilized is a Wi-Fi access technology type. Additional fields that can also be included in the session initiation protocol invitation packet can include a subscriber device number, a contact name, and any other pertinent information necessary to initiate and/or establish communication between a first device and a second device (e.g., between the initiating user equipment device and system 100).

Management component 102, on determining that the session initiation protocol invitation packet includes a field that denotes that the initiating user equipment unit device is connected to the multiple access communication network via a Wi-Fi access point, can display an message on a display associated with system 100 (not shown) that the access network technology type being used by the initiating user equipment unit device to access the multiple access communication network and to establish communication with system 100 is a Wi-Fi access network technology type. Typically, the displayed message can also include at least the subscriber number (e.g., telephone number) associated with the initiating user equipment unit. Additional information included in the session initiation protocol invitation packet, as will be appreciated, can also be displayed as necessary and/or required.

It should be noted that the field within the session initiation protocol invitation packet can be a bit or a flag that is either set ON or OFF (e.g., OFF=0 and ON=1) depending on implementation. Thus, in accordance with one implementation or embodiment, where the bit is set to ON, management component 102 can interpret this as being an indication that the initiating user equipment unit is utilizing a Wi-Fi access network technology type. Conversely, where the bit is set to OFF, management component 102 can interpret this as being an indication that the initiating user equipment unit is using an implementation of the evolved packet core associated with a long term evolution technology implementation, in which case management component 102 can cause a message to be displayed to reflect this reality. Once again, depending on implementation, where the session initiation protocol invitation packet does not contain a field that indicates the access network technology type of the initiating user equipment unit, the default interpretation in this circumstance can be to infer or deduce that the initiating user equipment unit is utilizing a Wi-Fi access network technology type. This latter provision can be beneficial where newer aspects of a long term evolution technology has not been implemented by the carrier.

Management component 102, in addition to the foregoing, based at least in part on, or as a function of, the identified and/or determined access network technology type ascertained from the session initiation protocol invitation packet sent by an initiating user equipment device, can also associate an icon or pictogram that denotes the access network technology type used by the initiating user equipment to establish the data interchange with system 100. Thus, management component 102, on establishing that a field included in the session initiation protocol invitation packet received from the initiating user equipment device indicates that the user equipment unit is attempting, or has attempted in the recent past (e.g., an immediately prior attempt), to establish communication with system 100 over a Wi-Fi access technology, can associate a pictogram or icon representing this reality (e.g., that the initiating user equipment device has initiated the contact over a Wi-Fi access technology) with a contact name stored in memory 106 and/or storage 108 (e.g., the contact name can have been entered in a contacts list/file persisted in memory 106 and/or storage 108). Additionally and/or alternatively, where management component 102 determines that the field included in the session initiation protocol invitation packet indicates that the initiating user equipment unit is attempting and/or has previously attempted to establish communication with system 100 over the evolved packet core of a long term evolution implementation, management component 102 can cause an icon or pictogram to be associated with a contact name persisted to memory 106 and/or storage 108, and/or to be displayed in association with the contact name on a display unit (not shown) communicatively coupled to system 100.

Figure 2:
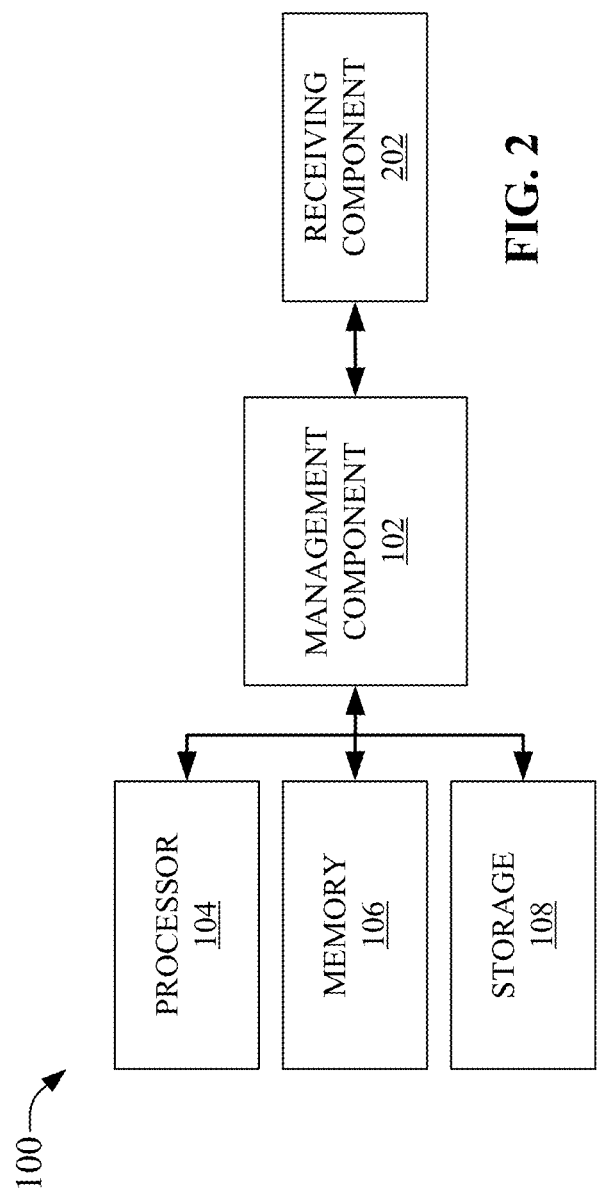
FIG. 2 is a further depiction of a system for enhancing user experience for Internet Protocol Multimedia Core Network Subsystem (IMS) based rich communication services in multiple access wireless communication networks/infrastructures in accordance with aspects of the subject disclosure.

FIG. 2 provides further illustration of system 100 in accordance with an aspect of the subject disclosure. As illustrated system 100 can include management component 102 that can, as described above, be communicatively coupled to processor 104, memory 106, and storage 108. Additionally system 100 can include receiving component 202 that can be in communication with management component 102 and can operate in conjunction with management component 102. Receiving component 202 can receive, as input 110, the session initiation protocol invitation packet that can have been dispatched from a calling user equipment unit to establish a communication and/or data interchange between the initiating user equipment device/unit and system 100 and thereafter communicated to management component 102 for further processing and/or manipulation.

Figure 3:
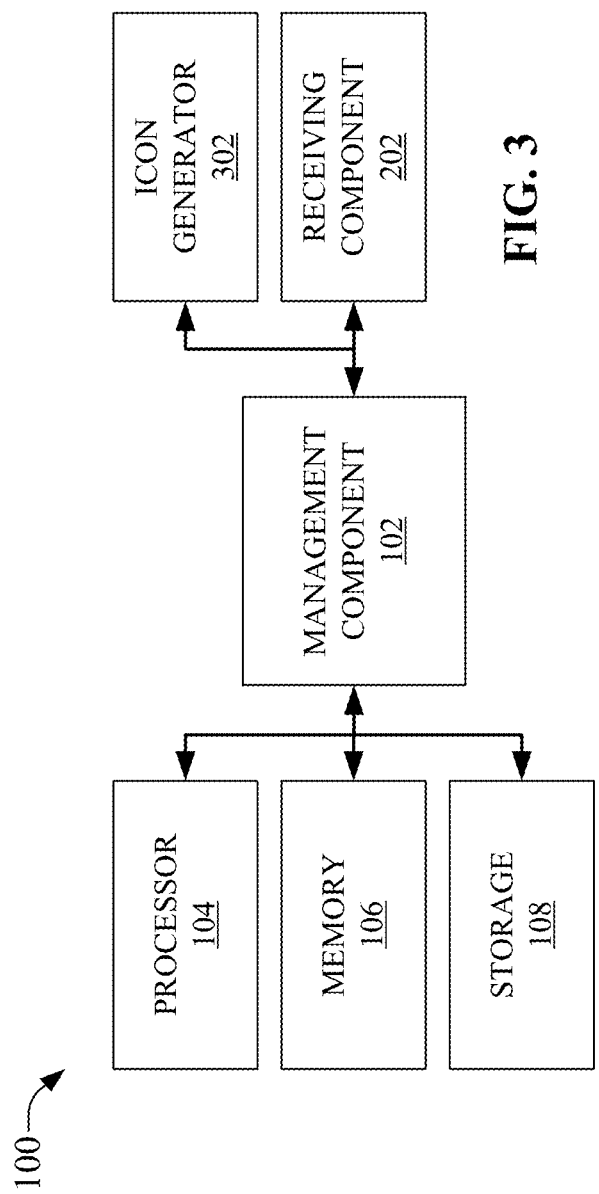
FIG. 3 illustrates a further system for enhancing user experience for Internet Protocol Multimedia Core Network Subsystem (IMS) based rich communication services in multiple access wireless communication networks/infrastructures in accordance with aspects of the subject disclosure.

FIG. 3 provides additional illustration of system 100 in accordance with a further aspect of the subject disclosure. As depicted, system 100 can include icon generation component 302 that can operate in collaboration with management component 102 which in turn can be in communication with processor 104, memory 106, and storage 108. Icon generation component 303, where management component 102 has ascertained that the received session initiation protocol invitation packet includes a field that indicates that the initiating user equipment device is attempting to establish a connection over a Wi-Fi access technology type, can generate and display a message on a display device associated with system 100 informing a user of system 100 that the incoming call from the initiating user equipment unit will be established using a Wi-Fi access technology type. An example of such a message is provided in FIG. 6. Additionally and/or alternatively, where management component 102 determines that the calling user equipment unit is attempting to establish a data interchange and/or a connection over aspects of the evolved packet core associated with the long term evolution, icon generation component 302 can cause system 100 to display an informational message on a display associated with system 100 notifying the user of system 100 that the incoming call is being established with a user equipment unit that is communicating using the evolved packet core.

Icon generation component 302, in conjunction with functionalities and/or facilities provided by management component 102, can also provide the functionality necessary to generate and/or associate an appropriate icon with a contact name that can have been stored to memory 106 and/or storage 108. Icon generation 302 can facilitate generating and/or associating the appropriate icon as a function of whether or not management component 102 determines whether the field included in the session initiation protocol invitation packet that denotes the access network technology type being utilized by an initiating user equipment unit has been set to ON or OFF, for example. Where, depending on implementation, it is determined that the field associated with the received session initiation protocol invitation packet has been set to ON, management component 102 can interpret this as indication that the calling user equipment unit is transmitting using aspects of the evolved packet core, and based on, or as a function of, this indication, icon generation component 302 can associate an icon with a contact name indicative of the fact that the initiating user equipment device is using, or has used in the recent past, an evolved packet core to communication with system 100. Where management component 102 determines that the field associated with the received session initiation protocol invitation packet has been set to OFF, icon generating component 302 can generate and/or associate an icon with a contact name that indicates that the calling user equipment unit is using, or has used in the past, facilities and/or functionalities associated with a Wi-Fi access network technology type.

Figure 4:
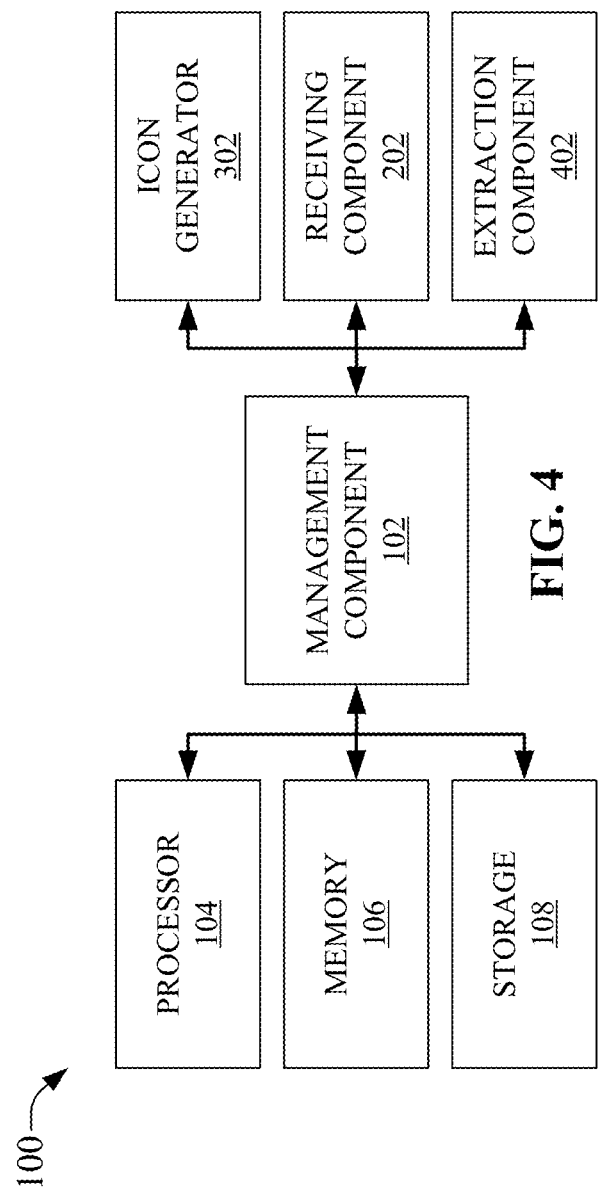
FIG. 4 is still yet a further illustration of a system for enhancing user experience for Internet Protocol Multimedia Core Network Subsystem (IMS) based rich communication services in multiple access wireless communication networks/infrastructures in accordance with aspects of the subject disclosure.

FIG. 4 provides further illustration of system 100 in accordance with another aspect of the subject disclosure. As illustrated, system 100 can include extraction component 402 that can operate in collaboration with management component 102. As has been noted above, and is depicted in FIG. 4, extraction component 402 can be communicatively coupled to management component 102 which in turn can be communicatively coupled with processor 104, memory 106, and storage 108. Extraction component 402 can be utilized by management component 102 to identify within the received session initiation protocol invitation packet a field that denotes the access network technology type that is currently being utilized by a calling user equipment unit to establish a communication session with system 100. It should be noted that there can be instances where, because the further aspects associated with the evolved packet core and/or the facilities necessary to animate the subject application have not been adopted, extraction component 402 can provide to management component 102 indication that the necessary field is not, or has not been, included in the received session initiation protocol invitation packet. In this instance, management component 102 can use the absence of the field in the session initiation protocol invitation packet as an indication that the calling user equipment unit is using the most plausible default access network technology type (e.g., Wi-Fi or long term evolution).

Figure 5:
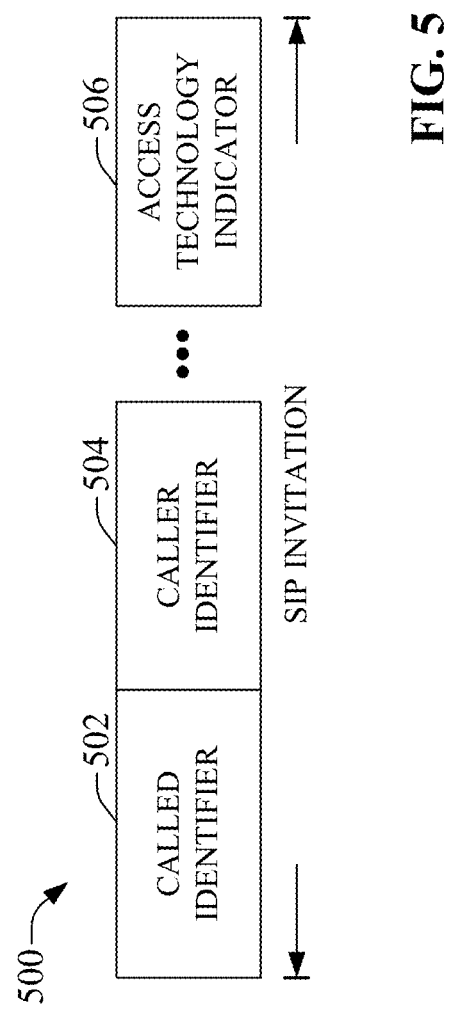
FIG. 5 depicts an illustrative session initiation protocol (SIP) invitation packet in accordance with aspects of the subject disclosure.

FIG. 5 illustrates a session initiation protocol (SIP) invitation packet 500 in accordance with an aspect of the subject disclosure. As depicted, session initiation protocol invitation packet 500 can comprise a plurality of fields that can include at least a first field 502 that can include a called identifier or a telephone number (e.g., subscriber number associated with an initiating user equipment device); a second field 504 that can include a caller identifier, such as a caller/contact name; and a third field 506 that can include an access technology indicator that can be utilized by system 100, and in particular management component 102, to identify and/or determine the access technology type that is being utilized by the initiating user equipment device to the multiple access communication network (e.g., whether the initiating user equipment device is using a Wi-Fi access network technology type or whether the initiating user equipment device is connected to the multiple access communication network via an evolved packet core implementation of the long term evolution).

Figure 6:
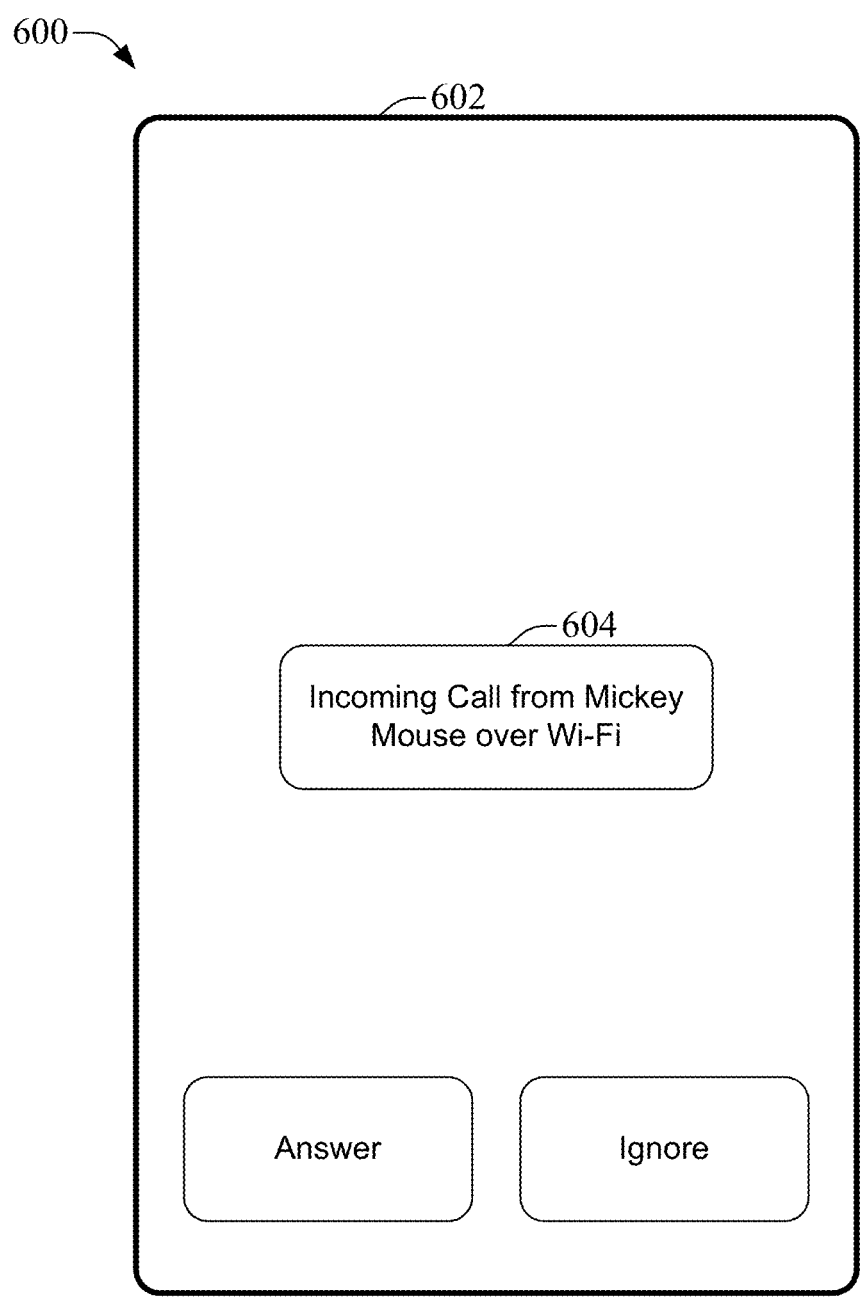
FIG. 6 provides illustration of an illustrative message that can be displayed by the disclosed system in accordance with aspects of the subject disclosure.

FIG. 6 depicts 600 an illustrative message 604 displayed on a user equipment device 602 (e.g., system 100) that has implemented the aspects outlined in the subject disclosure. As will be noted, message 604 contains a notification message informing the user that the incoming call from the subscriber station device being used by "Mickey Mouse" is being facilitated through a Wi-Fi access network technology. It will nevertheless be appreciated by those of ordinary skill, that where the subscriber station device being used by "Mickey Mouse" had been from a device accessing features associated with the evolved packet core, the displayed message can be modified to appropriately reflect this situation. For example, the displayed message could state: "Incoming Call from Mickey Mouse over EPC/LTE".

Figure 7:
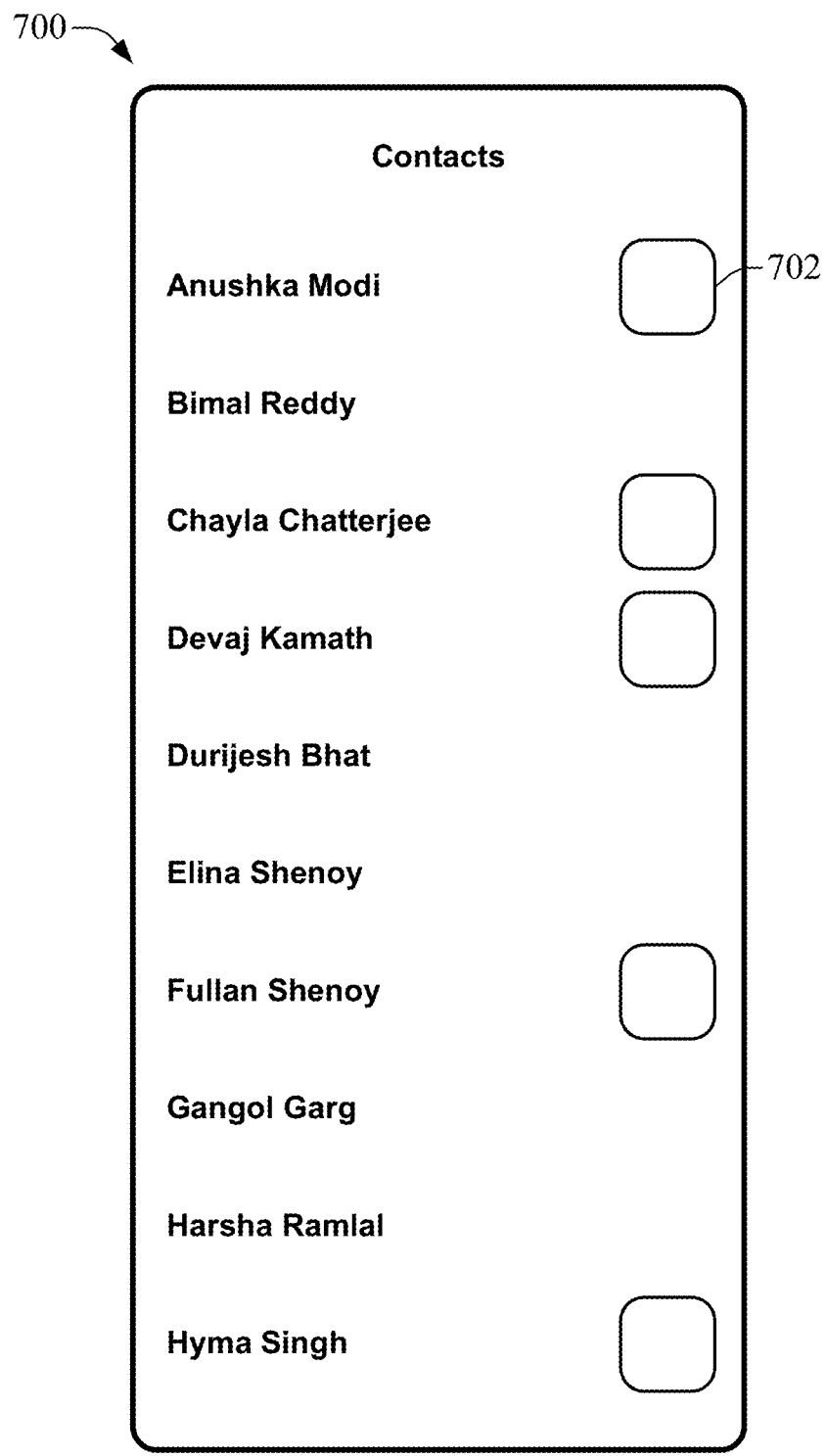
FIG. 7 provides an additional illustration of an address book (contact list) display that can be displayed by the disclosed system in accordance with aspects of the subject disclosure.

FIG. 7 is a depiction of an illustrative address book contacts list 700 as displayed on a user equipment device, such as system 100, in accordance with the subject disclosure. As depicted, the address book contacts list 700 can include an icon 702 that can be selectively associated with contact names. The selectivity of association of the icon with the a contact name can be based on, or be a function of, a received (or previously received) session initiation protocol invitation packet, as detailed above. Thus, depending on implementation, the icon 702 can be associated and/or displayed in conjunction with a contact name when the user device affiliated with the contact name initiated a call from a device associated with the evolved packet core aspects of the multiple access communication network. Additionally and/or optionally, the icon 702 can be associated and/or displayed in conjunction with a contact name when the user device associated with the contact name initiated communication from a device affiliated with Wi-Fi aspects of the multiple access communication network.

In view of the foregoing, it should be noted that as may have been used herein, high end and/or low end user equipment units, access terminals, subscriber handset devices, subscriber devices, and the like, are determined as a function of handset and/or device capability. Generally, a high end handset device is a device that is capable of using the more recent functionality and/or facilities associated with and/or provided by implementations of the evolved packet core of the long term evolution technology and/or by further advances and implementation of the long term evolution next generation technologies. A low end handset device will typically be a device that is unable and/or incapable of taking advantage of implementations of the long term evolution technology and/or advances and/or implementations of long term evolution next generation technologies.

Figure 8:
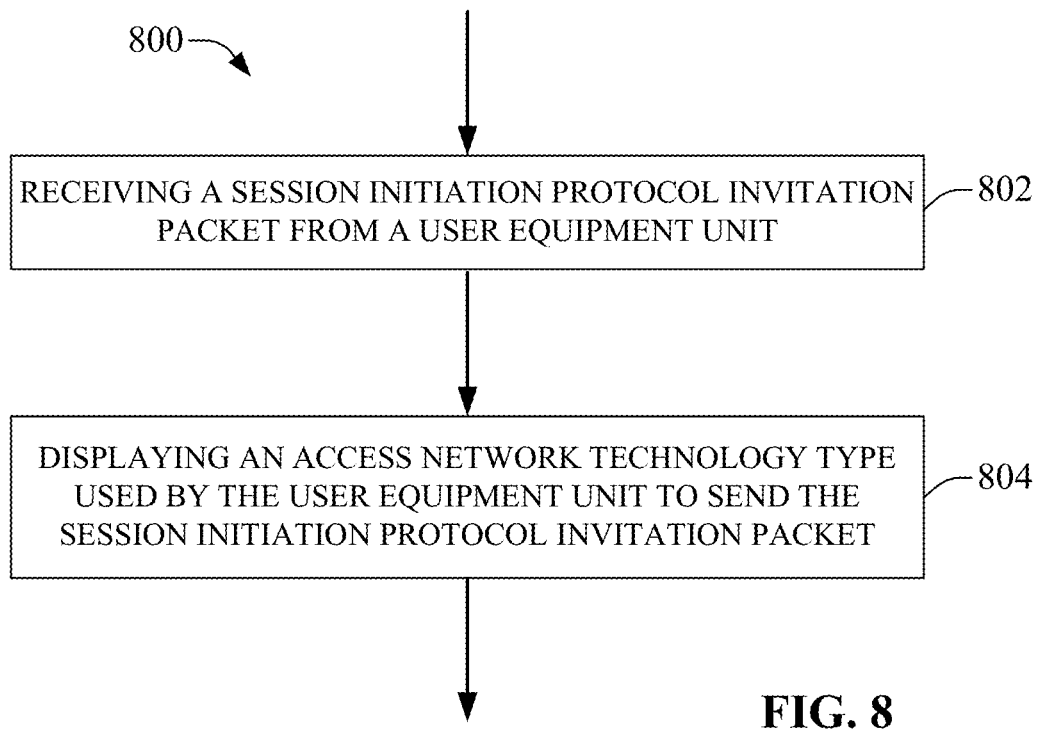
FIG. 8 illustrates a method for enhancing user experience for Internet Protocol Multimedia Core Network Subsystem (IMS) based rich communication services in multiple access wireless communication networks/infrastructures in accordance with aspects of the subject disclosure.
Figure 9:
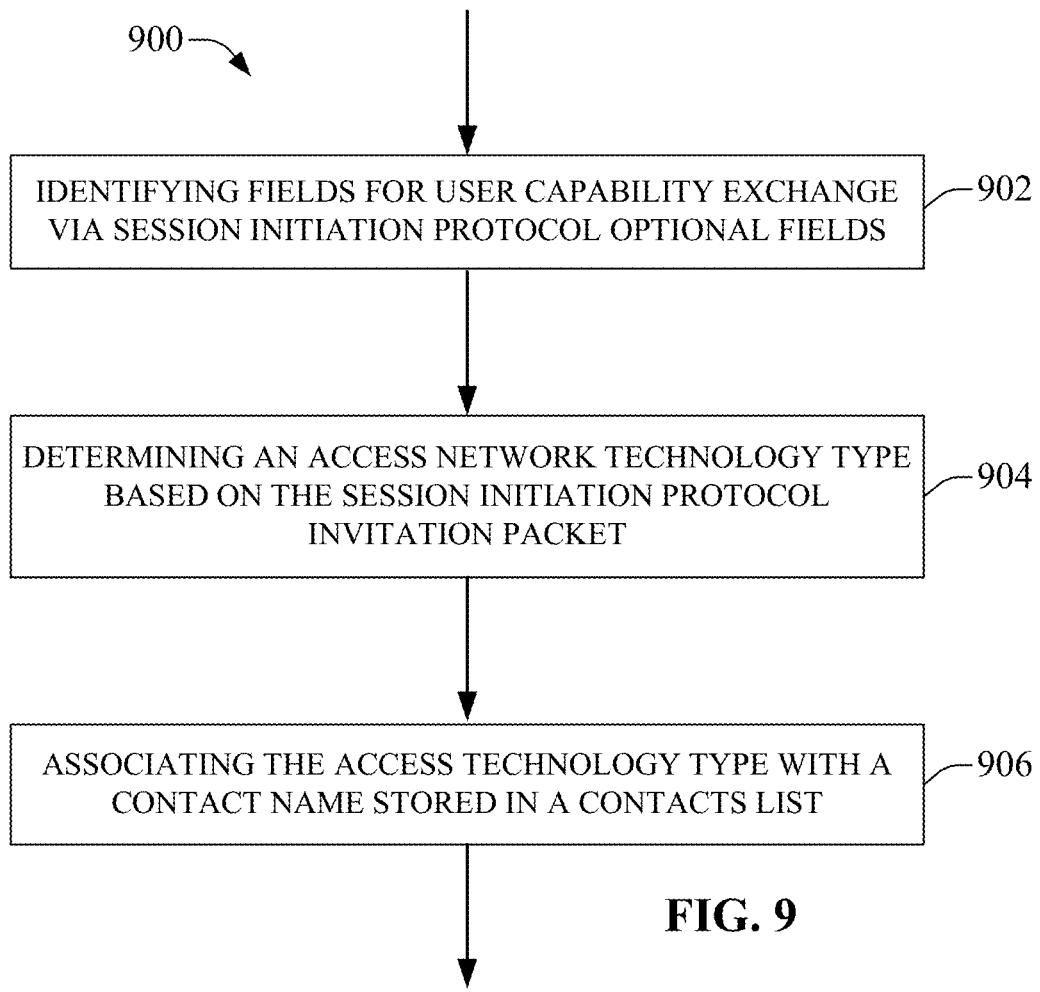
FIG. 9 illustrates a further method for enhancing user experience for Internet Protocol Multimedia Core Network Subsystem (IMS) based rich communication services in multiple access wireless communication networks/infrastructures in accordance with aspects of the subject disclosure.

In view of the example system(s) described above, example method(s) that can be implemented in accordance with the disclosed subject matter can be better appreciated with reference to flowchart in FIGS. 8-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for enhancing user experience for Internet Protocol Multimedia Core Network Subsystem (IMS) based rich communication services in multiple access wireless communication networks/infrastructures. Method 800 can commence at 802 where a session initiation protocol invitation packet is received from a calling user device unit. Typically, the received session initiation protocol invitation packet typically will include a field that provides indication regarding the access technology that is being used by the calling user device unit to establish the call. At 804 the access network technology type that was used by the calling device to establish contact can be displayed.

FIG. 9 illustrates a further method 900 for enhancing user experience for Internet Protocol Multimedia Core Network Subsystem (IMS) based rich communication services in multiple access wireless communication networks/infrastructures. Method 900 can commence at 902 where fields included in a received session initiation protocol invitation packet can be identified for user device capability exchange (e.g., via received session initiation protocol optional fields). The fields, as illustrated in FIG. 5, can include a called identifier, a subscriber unit device number (e.g., telephone number), a contact name, a field that indicates the access network technology type used by the subscriber unit to establish a call with a remote/receiving subscriber unit, a media access control address associated with the subscriber unit device, and the like. At 904, in response to identifying that the session initiation protocol invitation packet contains a field (e.g., a bit flag) that indicates the access network technology type that was used by the calling subscriber unit to contact the receiving subscriber unit, the access network technology type (e.g., based on, or as a function of, the bit flag) can be identified (e.g. Wi-Fi or EPC/LTE). At 906 the identified access network technology type can be associated with a contact name that can have been stored in a file persisted to memory 104 and/or storage 108.

Figure 10:
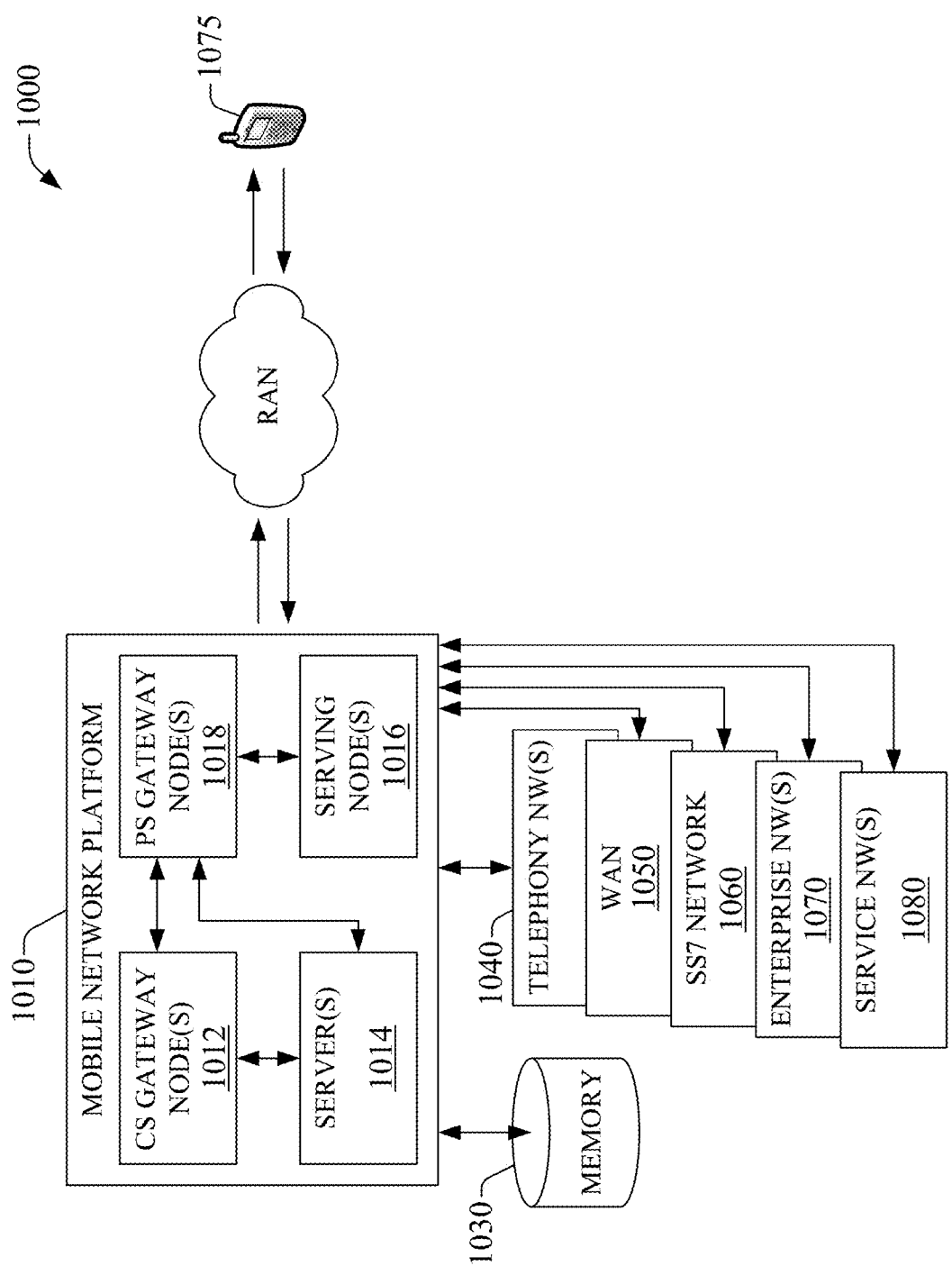
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

Figure 11:
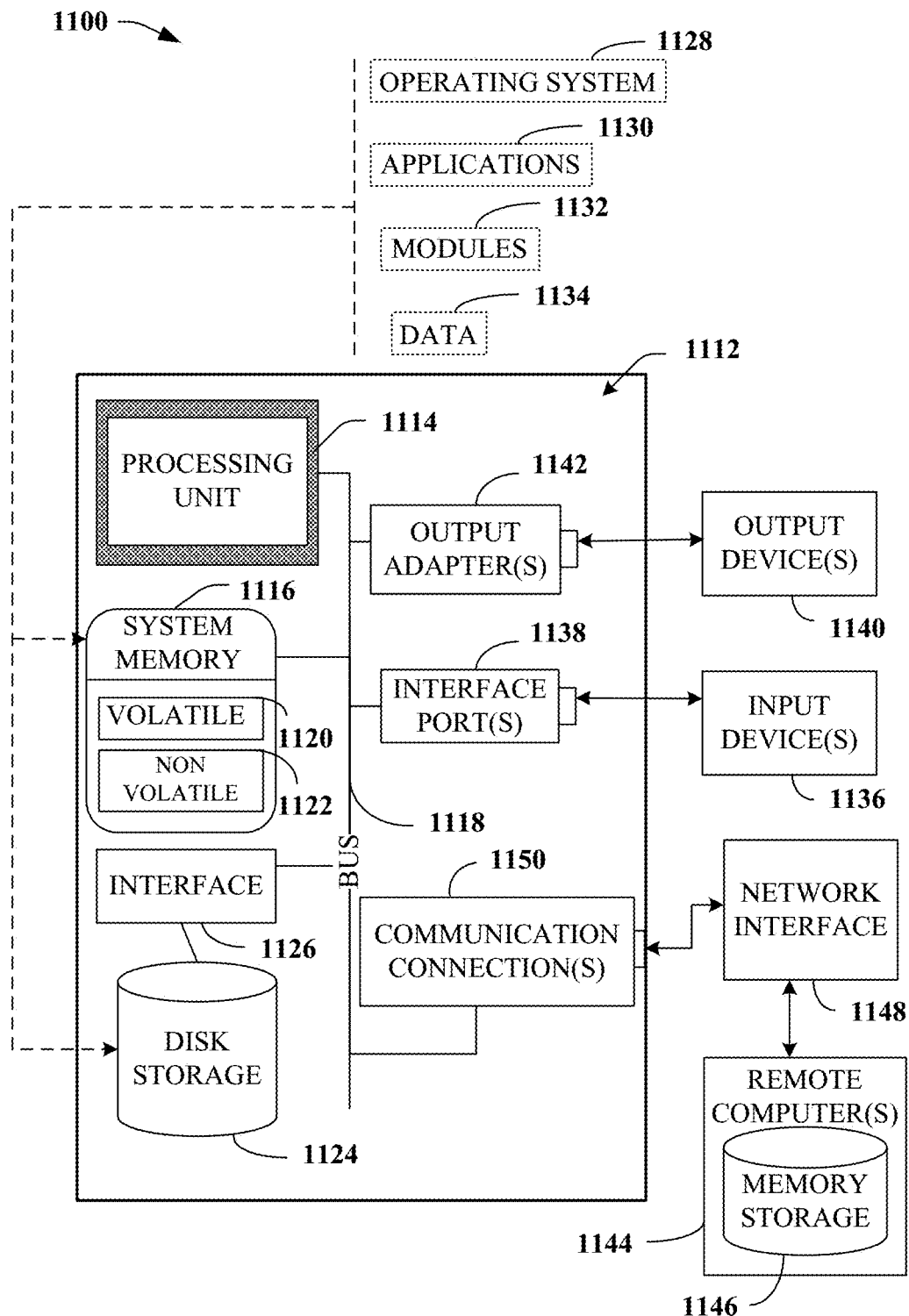
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 100, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, system 100 can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
    initiating a communication session in response to receiving packet data comprising an access network type and a field representative of a media access control address, wherein the access network type is a non-long term evolution access network type used by a mobile device to send the packet data; and
    as a function of the packet data, decoding and displaying the access network type used by the mobile device to access a network device of a communication network.

2. The system of claim 1, wherein the operations further comprise associating data representing a pictogram representing the access network type with a contact name stored in the memory.

3. The system of claim 1, wherein the access network type is determined as a function of a type of access point device determined to be coupled to the network device.

4. The system of claim 3, wherein the access point device is determined to communicate with the mobile device via a wireless exchange of data using a radio wave.

5. The system of claim 3, wherein the access point device is coupled to the network device of the communication network via a wire configured to transmit digital data to the network device of the communication network.

6. The system of claim 1, wherein the network device accesses the network device by using a long term evolution access protocol.

7. A method, comprising:
receiving, by a system comprising a processor, packet data comprising an access network technology type and a field representative of a media access control address associated with a device, wherein the access network technology type is a non-long term evolution evolved packet core network access network technology type; and
as a function of a bit field included in the packet data, displaying, by the system, a message that comprises the access network technology type used by a device to send the packet data via a network device of a wireless network.

8. The method of claim 7, wherein the bit field is included in a session initiation protocol invitation packet.

9. The method of claim 7, wherein the device is a first device, and the method further comprises, as a function of the packet data, associating, by the system, data representing an icon that indicates the access network technology type used by the first device to communicate wirelessly with a second device coupled to the network device.

10. The method of claim 7, wherein the device is a first device, and wherein the access network technology type used by the first device to communicate wirelessly with a second device coupled to a first network device of a multiple access communication network is determined based on an access network topology type associated with a third device via which the first device is coupled to a second network device of the wireless network.

11. The method of claim 10, wherein the third device uses a radio wave exchange of packets between the first device and the second device.

12. The method of claim 10, wherein the third device transmits a packet via a wire to the second network device of the wireless network.

13. A machine-readable storage medium, comprising executable instructions that, when executed by a processor, facilitate performance of operations, comprising:
receiving, from a device, packet data comprising a first field representing an access network technology type used to transmit the packet data via an access point device coupled to a multiple access communication network device and a second field representing a media access control address associated with the device; and
initiating a display of a message that comprises the access network technology type.

14. The machine-readable storage medium of claim 13, wherein the operations further comprise associating data that represents a pictogram that denotes the access network technology type with a contact name included in a contact list data structure.

15. The machine-readable storage medium of claim 13, wherein the access network technology type is determined as a function of being coupled to the access point device coupled to the device and the multiple access communication network device.

16. The machine-readable storage medium of claim 15, wherein the access point device communicates with the device via a wireless interchange of data using a radio wave.

17. The machine-readable storage medium of claim 15, wherein the access point device communicates with the multiple access communication network device by transmitting digital data via a wire to the multiple access communication network device.

18. The machine-readable storage medium of claim 13, wherein the access network technology type is a non-long term evolution evolved packet core network access network technology type.

19. The machine-readable storage medium of claim 13, wherein the device transmits the packet data according to a long term evolution protocol implemented by the multiple access communication network device.

20. The machine-readable storage medium of claim 13, wherein the operations further comprise associating data that represents an icon that denotes the access network technology type with a contact name included in a memory.

* * * * *